(12) United States Patent
Dinan

(10) Patent No.: US 9,107,206 B2
(45) Date of Patent: Aug. 11, 2015

(54) CARRIER GROUPING IN MULTICARRIER WIRELESS NETWORKS

(71) Applicant: Esmael Hejazi Dinan, Herndon, VA (US)

(72) Inventor: Esmael Hejazi Dinan, Herndon, VA (US)

(73) Assignee: Ofinne Technologies, LLC, Herndon, VA (US)

( * ) Notice: Subject to any disclaimer, the term of this patent is extended or adjusted under 35 U.S.C. 154(b) by 233 days.

(21) Appl. No.: 13/920,012

(22) Filed: Jun. 17, 2013

(65) Prior Publication Data

US 2013/0336296 A1    Dec. 19, 2013

Related U.S. Application Data

(60) Provisional application No. 61/661,329, filed on Jun. 18, 2012, provisional application No. 61/680,544, filed on Aug. 7, 2012.

(51) Int. Cl.
*H04W 72/04* (2009.01)
*H04W 72/00* (2009.01)
*H04L 5/00* (2006.01)

(52) U.S. Cl.
CPC ........... *H04W 72/0406* (2013.01); *H04L 5/001* (2013.01); *H04L 5/0053* (2013.01); *H04L 5/0098* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 2007/0189205 A1 | 8/2007 | Terry et al. | |
| 2010/0227569 A1 | 9/2010 | Bala et al. | |
| 2011/0261776 A1 | 10/2011 | Ahn et al. | |
| 2011/0268032 A1 | 11/2011 | Kim et al. | |
| 2011/0299489 A1 | 12/2011 | Kim et al. | |
| 2012/0008600 A1 | 1/2012 | Marinier et al. | |
| 2012/0076103 A1 | 3/2012 | Dai et al. | |
| 2012/0113914 A1 | 5/2012 | Zhao et al. | |
| 2012/0113941 A1 | 5/2012 | Chung et al. | |
| 2012/0113962 A1 | 5/2012 | Jen | |
| 2012/0243498 A1 | 9/2012 | Kwon et al. | |
| 2012/0250520 A1* | 10/2012 | Chen et al. | 370/241 |
| 2012/0287865 A1* | 11/2012 | Wu et al. | 370/329 |
| 2012/0300743 A1 | 11/2012 | Kim et al. | |
| 2012/0307811 A1 | 12/2012 | Kwon et al. | |

FOREIGN PATENT DOCUMENTS

WO    WO2011/120716 A1    10/2011

OTHER PUBLICATIONS

3GPP TSG RAN WG2 Meeting #76, R2-115791 San Francisco, USA, Nov. 14-18, 2011 Source: CATT Title: Signaling for TAG configuration.
3GPP TSG-RAN WG2 Meeting #74 R2-113014 Barcelona, Spain, May 9-13, 2011 Source: Renesas Mobile Europe Title: Multiple timing advance using multiple RACH.

(Continued)

*Primary Examiner* — Kenny Lin
(74) *Attorney, Agent, or Firm* — Esmael Dinan; David Grossman

(57) ABSTRACT

A base station transmits an RRC message to modify a first cell group index of a first cell. If the first cell is a primary cell, the RRC message reconfigures the primary cell as a secondary cell with an updated first cell group index and the RRC message comprises mobility control information. If the first cell is a secondary cell, the RRC message releases the secondary cell and adds the secondary cell with an updated first cell group index without employing mobility control information.

20 Claims, 11 Drawing Sheets

1100
Transmit at least one first RRC message to configure cell groups

1102
Transmit second RRC message to change configuration of cell groups

(56) References Cited

OTHER PUBLICATIONS

3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAN WG2 Meeting#72bis, Tdoc R2-110356 Dublin, Ireland, Jan. 17-21, 2011 Source: ITRI Title: RF Receiver Information in UE Capability Signalling.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TSG-RAN WG2 #74 Tdoc R2-113258 Barcelona, Spain, May 9-13, 2011 Source: InterDigital Communications Title: Support for RACH on SCells in LTE CA.
3GPP TSG RAN WG2 Meeting #77bis, R2-121192 Jeju, Korea, Mar. 26-30, 2012 Source: New Postcom Title: Path loss reference and RLM on SCell.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG-RAN WG2#77, R2-120218 Dresden, Germany, Feb. 6-10, 2012 Source: Sharp Title: TA group handling.
3GPP TSG RAN WG2 #69bis R2-102395 Beijing, China, Apr. 12-16, 2010 Source: Qualcomm Incorporated Title: UL and DL Component Carrier Linking.
3GPP TSG RAN WG1 #68bis, R1-121425 Jeju, Korea, Mar. 26-30, 2012 Source: LG Electronics Title: SRS transmissions in multiple TA.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).
3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).
3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
R2-121899 3GPP TSG-RAN2 Meeting #77bis Jeju, Korea, Mar. 26-30, 2012 Change Request 36.300.

* cited by examiner

CARRIER GROUPING IN MULTICARRIER WIRELESS NETWORKS

CROSS-REFERENCE TO RELATED APPLICATIONS

This application claims the benefit of U.S. Provisional Application No. 61/661,329, filed Jun. 18, 2012, and U.S. Provisional Application No. 61/680,544, filed Aug. 7, 2012, which are hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
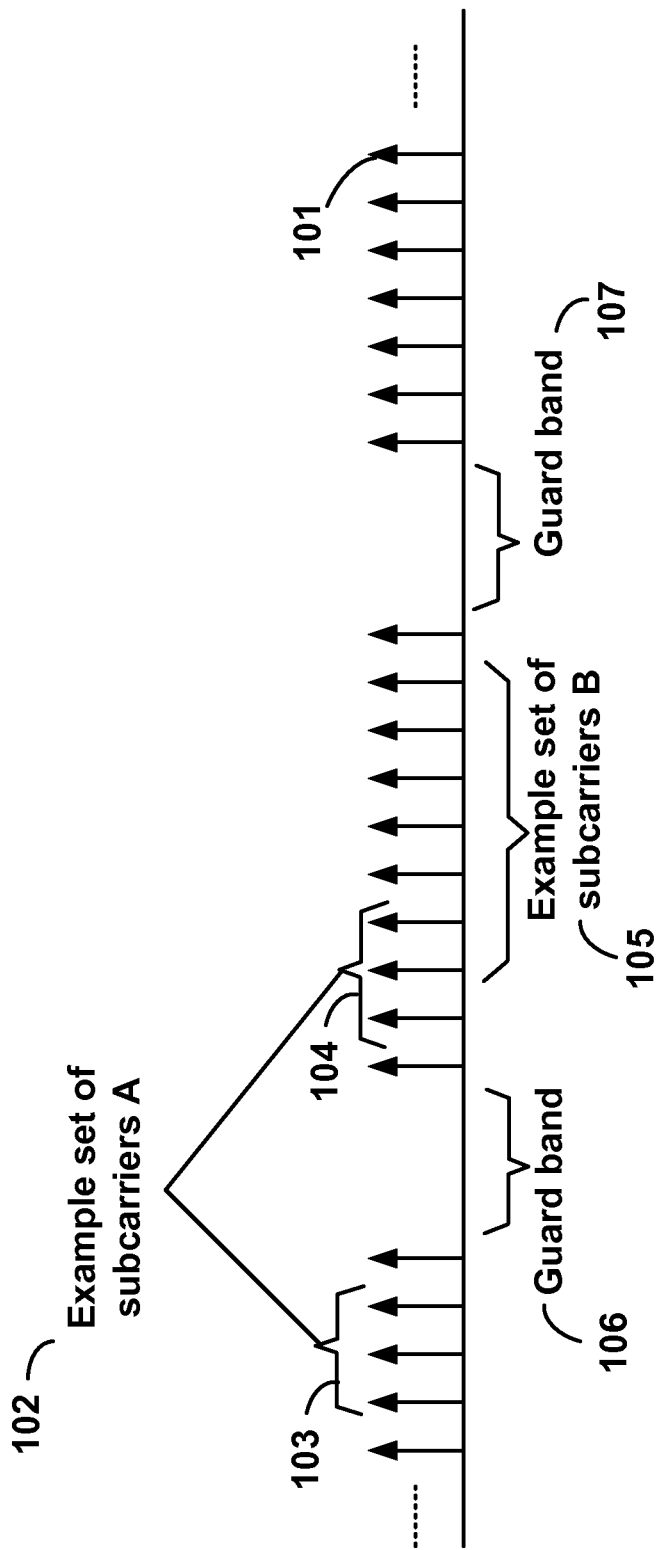
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
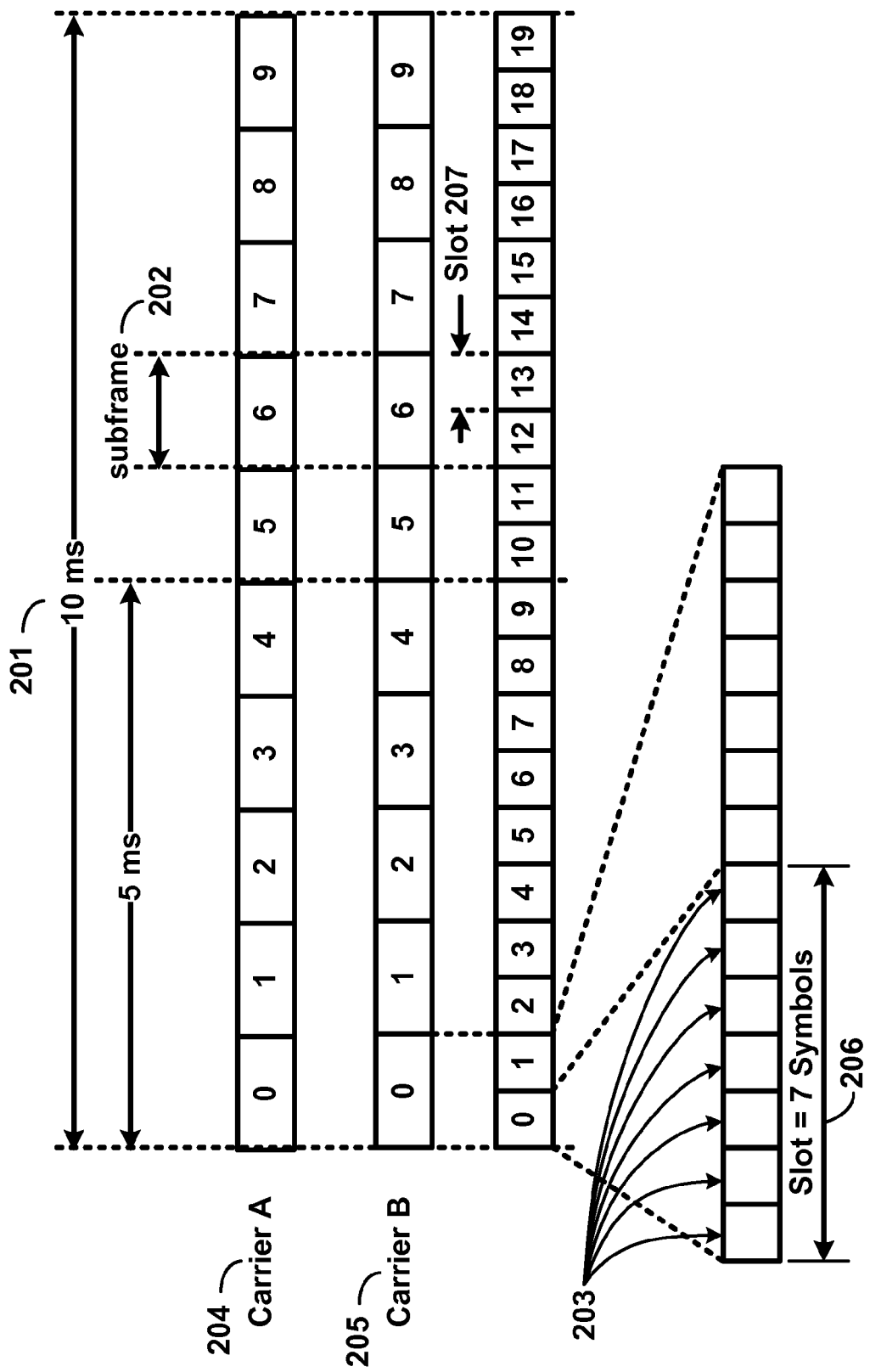
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 sub-frames may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
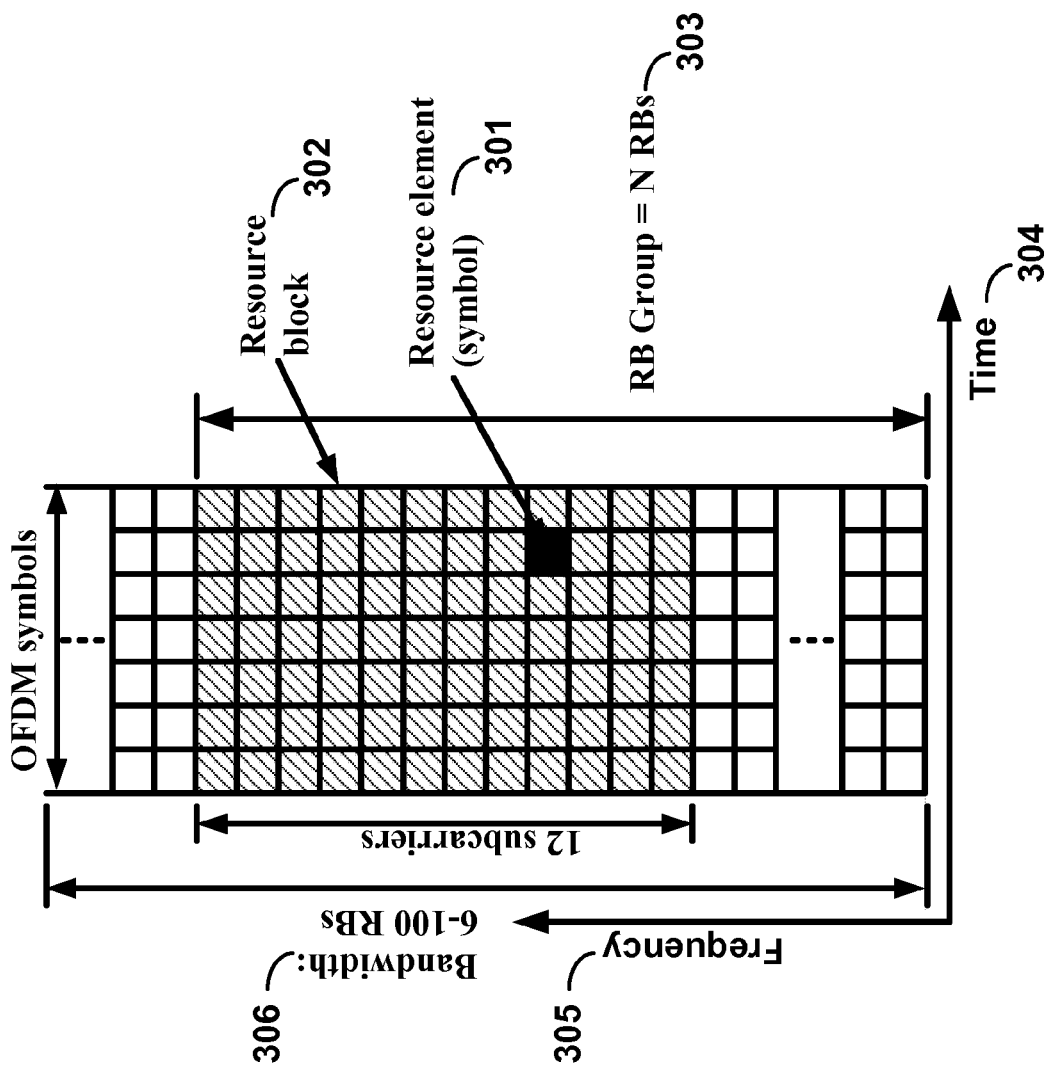
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

Figure 4:
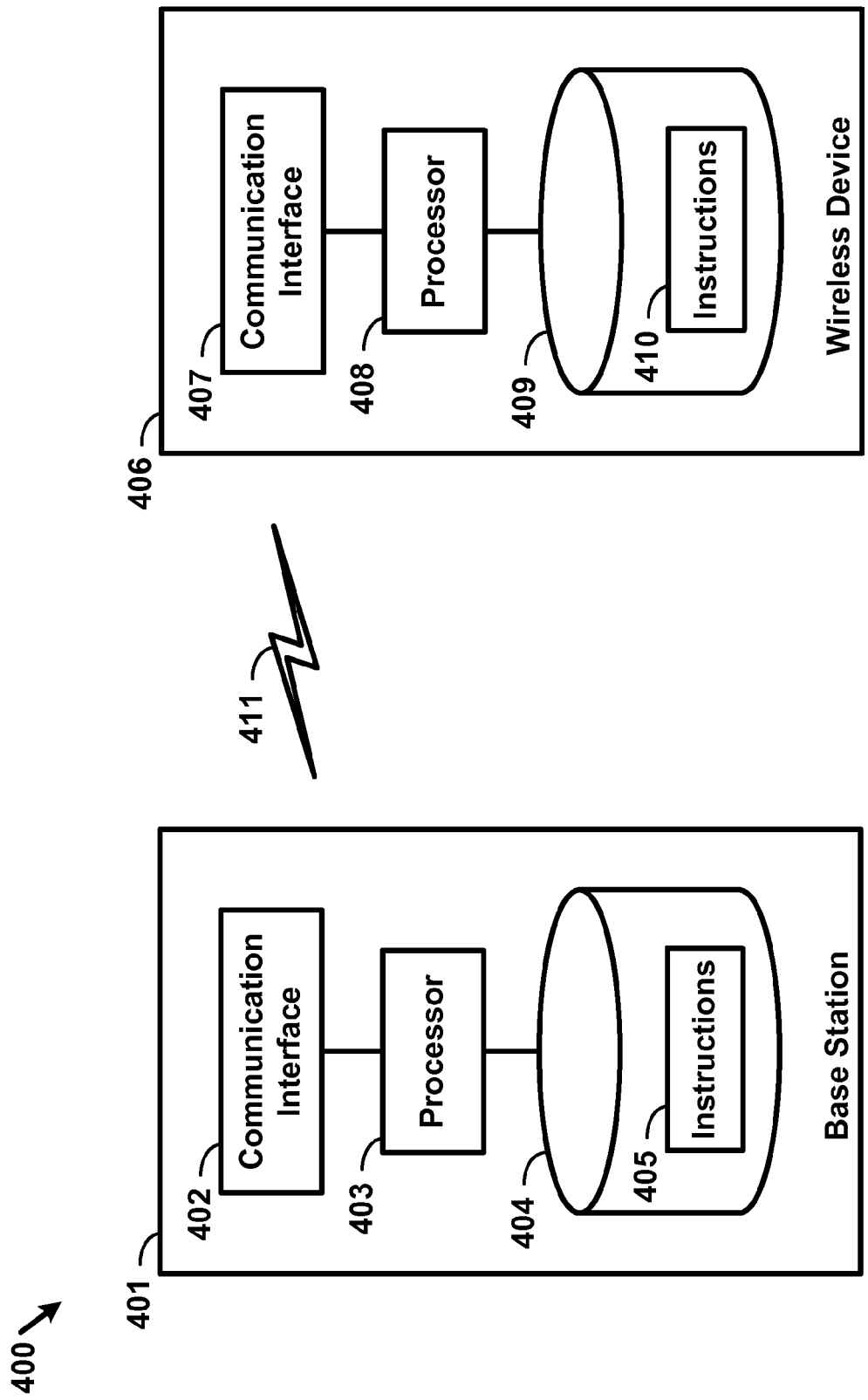
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference.

Figure 5:
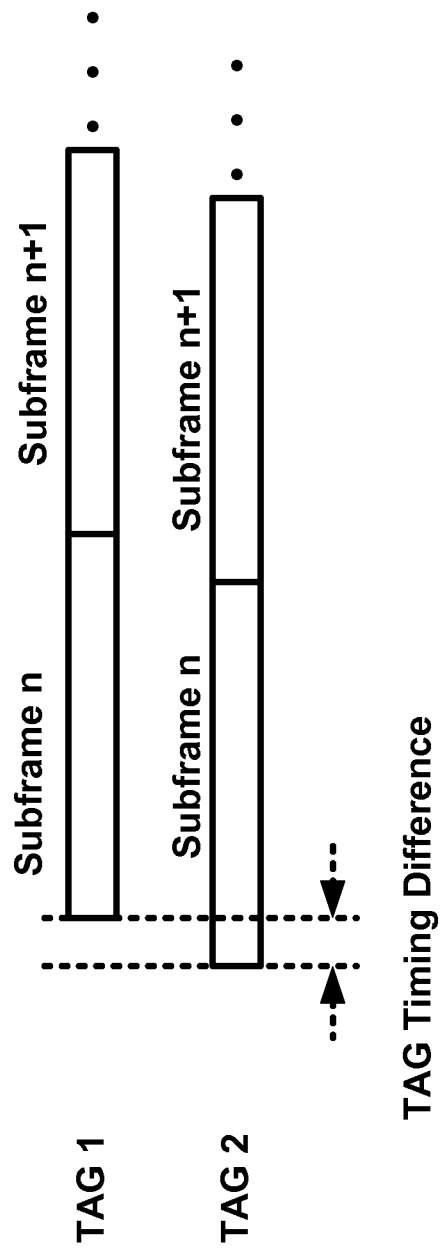
FIG. 5 is a diagram depicting uplink transmission timing of one or more cells in a first timing advance group (TAG) and a second TAG as per an aspect of an embodiment of the present invention.

FIG. 5 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 5 may be the difference in UE uplink transmission timing for uplink carriers in TAG1 and TAG2. The timing difference may range between, for example, sub micro-seconds to about 3o micro-seconds.

Figure 7:
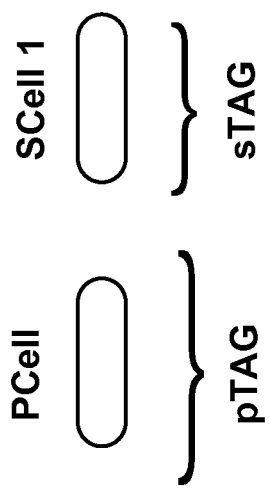
FIG. 7 shows example TAG configurations as per an aspect of an embodiment of the present invention.
Figure 7:
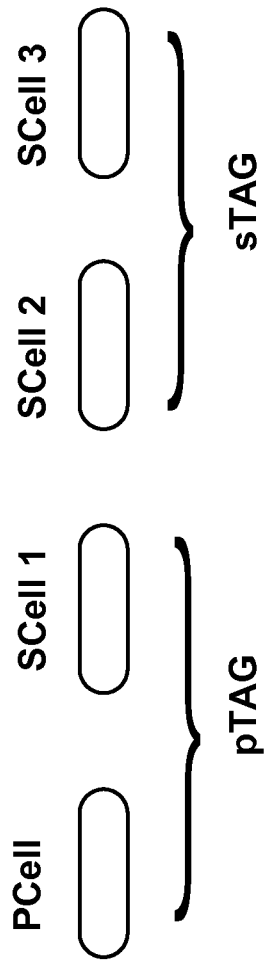
Figure 7:
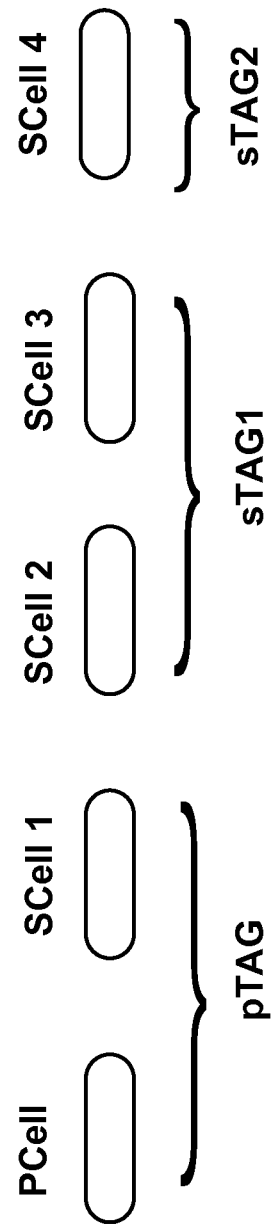

FIG. 7 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. For SCell(s) in a pTAG, the choice of pathloss reference for cells may be selected from and be limited to the following two options: a) the downlink SCell linked to an uplink SCell using the system information block 2 (SIB2), and b) the downlink pCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG. The downlink SCell linked to an uplink SCell using the system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s).

Figure 6:
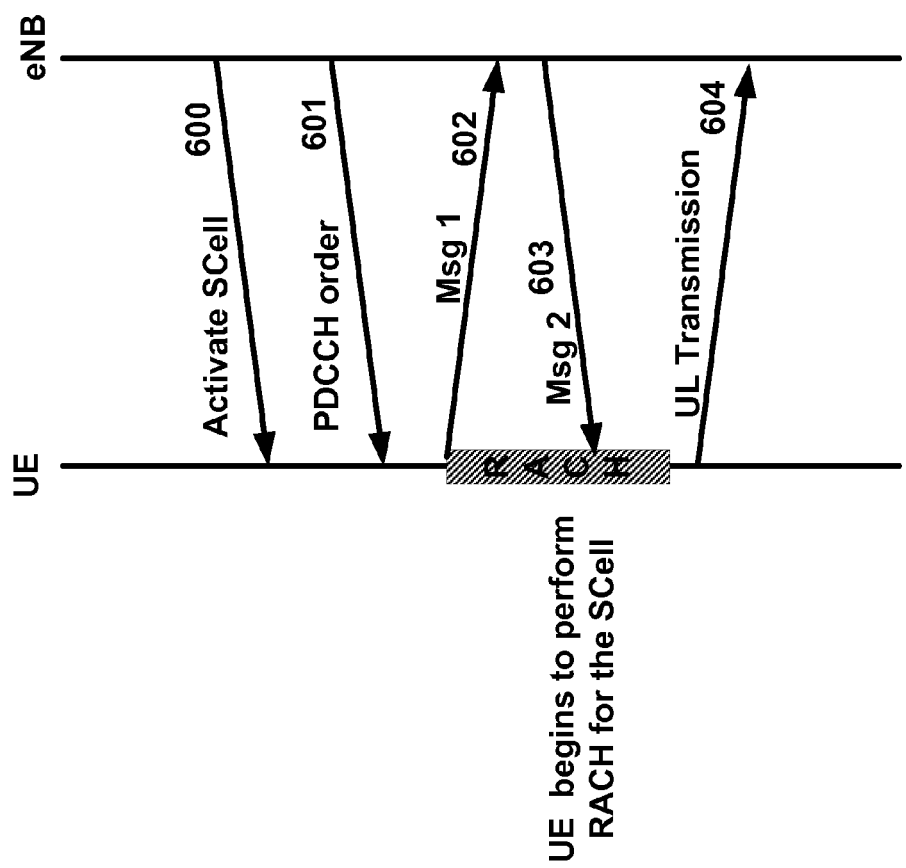
FIG. 6 is an example message flow in a random access process in a secondary TAG as per an aspect of an embodiment of the present invention.

FIG. 6 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-RNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding with an initial TA command NTA (amount of timing advance) within the random access response window. The start of the random access preamble may be aligned with the start of the corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device.

According to some of the various aspects of various embodiments, the base station or wireless device may group cells into a plurality of cell groups. The term "cell group" may refer to a timing advance group (TAG) or a timing alignment group or a time alignment group. Time alignment command may also be referred to timing advance command. A cell group may include at least one cell. A MAC TA command may correspond to a TAG. A cell group may explicitly or implicitly be identified by a TAG index. Cells in the same band may belong to the same cell group. A first cell's frame timing may be tied to a second cell's frame timing in a TAG. When a time alignment command is received for the TAG, the frame timing of both first cell and second cell may be adjusted. Base station(s) may provide TAG configuration information to the wireless device(s) by RRC configuration message(s).

The mapping of a serving cell to a TAG may be configured by the serving eNB with RRC signaling. The mechanism for TAG configuration and reconfiguration may be based on RRC signaling. According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding(configuring) a new SCell (with the same physical cell ID and frequency) with an updated TAG ID. The new SCell with the updated TAG ID may be initially inactive subsequent to being assigned the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. For example if there is a need to move an SCell from an sTAG to a pTAG, at least one RRC message, for example, at least one RRC reconfiguration message, may be send to the UE to reconfigure TAG configurations by releasing the SCell and then configuring the SCell as a part of pTAG (when an SCell is added/configured without a TAG index, the SCell is explicitly assigned to pTAG). The PCell may not change its TA group and may always be a member of the pTAG.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements or received signal timing. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head) coverage area. The signal delay for that SCell may become different from the original value and different from other serving cells in the same TAG. In this scenario, eNB may reconfigure this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

The parameters related to SCell random access channel may be common to all UEs. For example PRACH configuration (RACH resources, configuration parameters, RAR window) for the SCell may be common to UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. In an example embodiment they may be included in one or two RRC messages. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to a TAG (implicitly for pTAG or explicitly for sTAG). PCell is always assigned to the pTAG.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least: I) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ the reference cell (the primary cell in pTAG and a secondary cell in an sTAG). The wireless device may employ a synchronization signal transmitted on the reference downlink carrier as timing reference to determine a timing of the uplink transmissions. The synchronization signal for example may be a) primary/secondary synchronization signal, b) reference signal(s), and/or c) a combination of a) and b). II) a time alignment timer for each cell group in the plurality of cell groups; and/or III) an activation timer for each configured secondary cell.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. A cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of sub-frames. For example, value sf500 corresponds to 500 sub-frames, sf750 corresponds to 750 sub-frames and so on. An uplink time alignment is common for all serving cells belonging to the same cell group. In an example embodiment, the IE TAG TAT may be defined as: TAG TAT::= SEQUENCE{TAG ID, ENUMERATED {sf500, sf750, sf1280, sf1920, sf2560, sf5120, sf10240, infinity}}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 m-sec), TAG1 (sTAG) time alignment timer value is 500 subframes, TAG2 time alignment timer value is 2560 subframes, and TAG3 time alignment timer value is 500 subframes. This is for example purposes only. In this example a TAG may take one of 8 predefined values. In a different embodiment, the enumerated values could take other values.

Figure 8:
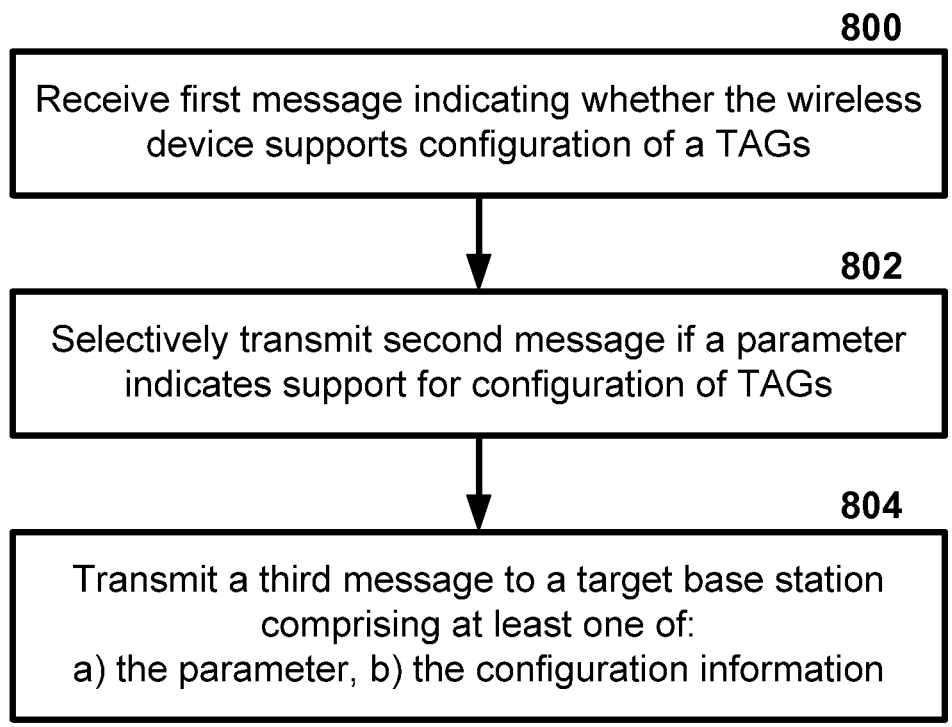
FIG. 8 is an example flow diagram illustrating signaling messages during a handover as per an aspect of an embodiment of the present invention.

FIG. 8 is an example flow diagram illustrating signalling messages during a handover as per an aspect of an embodiment of the present invention. An important issue with respect to TAG configuration is how TAG configuration may be maintained or updated during a handover. A UE may be configured with a first TAG configuration with a serving eNB. A target eNB may maintain the same TAG configuration, or may update the UE TAG configuration. The target eNB may have a different cell configuration and may require a different TAG configuration. In another example embodiment, the target eNB may employ cells with the same frequencies as the serving cell and may require maintaining the same TAG configuration. The target eNB may configure TAG configuration after the handover is completed or may configure TAG configuration during the handover process. Release 10 of LTE does not support multiple TAG configuration, and addressing the TAG configuration changes during handover is not addressed in release 10 LTE technology. There is a need for developing a signalling flow, UE processes, and eNB processes to address TAG configuration and TAG configuration parameter handling during the handover to reduce the handover overhead and delay, and increase handover efficiency.

Furthermore, there is a need to develop handover signalling and handover message parameters to address TAG configuration during a handover process.

According to some of the various aspects of embodiments, in RRC_CONNECTED mode, the network may control UE mobility, for example, the network may decide when the UE connects to which E-UTRA cell(s) or inter-RAT cell. For network controlled mobility in RRC_CONNECTED, the PCell may be changed using an RRC Connection Reconfiguration message including the mobilityControlInfo (handover). The SCell(s) may be changed using the RRC Connection Reconfiguration message either with or without the mobilityControlInfo. The network may trigger the handover procedure e.g. based on radio conditions, load, QoS, UE category, and/or the like. To facilitate this, the network may configure the UE to perform measurement reporting (possibly including the configuration of measurement gaps). The network may also initiate handover blindly, for example without having received measurement reports from the UE. Before sending the handover message to the UE, the source eNB may prepare one or more target cells. The source eNB may select the target PCell. The source eNB may also provide the target eNB with a list of best cells on each frequency for which measurement information is available, for example, in order of decreasing RSRP. The source eNB may also include available measurement information for the cells provided in the list. The target eNB may decide which SCells are configured for use after handover, which may include cells other than the ones indicated by the source eNB.

According to some of the various aspects of embodiments, the target eNB may generate a message used to configure the UE for the handover, for example, the message including the access stratum configuration to be used in the target cell(s). The source eNB may transparently (for example, does not alter values/content) forward the handover message/information received from the target eNB to the UE. When appropriate, the source eNB may initiate data forwarding for (a subset of) the dedicated radio bearers. After receiving the handover message, the UE may attempt to access the target PCell at the available RACH occasion according to a random access resource selection. When allocating a dedicated preamble for the random access in the target PCell, E-UTRA may ensure the preamble is available from the first RACH occasion the UE may use. Upon successful completion of the handover, the UE may send a message used to confirm the handover to the target eNB.

According to some of the various aspects of embodiments, if the target eNB does not support the release of RRC protocol which the source eNB used to configure the UE, the target eNB may be unable to comprehend the UE configuration provided by the source eNB. In this case, the target eNB may use the full configuration option to reconfigure the UE for handover and re-establishment. Full configuration option includes an initialization of the radio configuration, which makes the procedure independent of the configuration used in the source cell(s) with the exception that the security algorithms are continued for the RRC re-establishment.

According to some of the various aspects of embodiments, after the successful completion of handover, PDCP SDUs may be re-transmitted in the target cell(s). This may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. UE behaviour to be performed upon handover may be the same regardless of the handover procedures used within the network (e.g. whether the handover includes X2 or S1 signalling procedures).

The source eNB may, for some time, maintain a context to enable the UE to return in case of handover failure. After having detected handover failure, the UE may attempt to resume the RRC connection either in the source PCell or in another cell using the RRC re-establishment procedure. This connection resumption may succeed if the accessed cell is prepared. For example, when the access cell is a cell of the source eNB or of another eNB towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, E-UTRAN may configure the UE to report that it is entering or leaving the proximity of cell(s) included in its CSG whitelist. E-UTRAN may request the UE to provide additional information broadcast by the handover candidate cell e.g. cell global identity, CSG identity, CSG membership status. E-UTRAN may use the proximity report to configure measurements as well as to decide whether or not to request additional information broadcast by the handover candidate cell. The additional information may be used to verify whether or not the UE is authorised to access the target PCell and may also be needed to identify handover candidate cell. This may involve resolving PCI confusion, for example, when the physical layer identity that is included in the measurement report may not uniquely identify the cell.

According to some of the various aspects of embodiments, the mapping of a serving cell to a TA group may be configured by the serving eNB with RRC signalling. The mechanism for TAG configuration and reconfiguration may be based on RRC signalling. When needed, the mapping between an SCell and a TA group may be reconfigured with RRC signalling. The mapping between an SCell and a TAG may not be reconfigured with RRC while the SCell is configured. For example if there is a need to move an SCell from an sTAG to a pTAG, at least one RRC message, for example at least one RRC reconfiguration message, may be send to the UE to reconfigure TAG configurations. PCell may not change TA group and may always be a member of the pTAG.

According to some of the various aspects of embodiments, when an eNB performs SCell addition configuration, the related TAG configuration may be configured for the SCell. eNB may modify TAG configuration of an SCell by removing (releasing) the SCell and adding a new SCell (with same physical cell ID and frequency) with an updated TAG ID. The new SCell with the updated TAG ID may be initially inactive subsequent to joining the updated TAG ID. eNB may activate the updated new SCell and then start scheduling packets on the activated SCell. It may not be possible to change the TAG associated with an SCell but rather the SCell needs to be removed and a new SCell needs to be added with another TAG. This may not employ mobilityControlInfo in the RRC reconfiguration message.

According to some of the various aspects of embodiments, an eNB may consider UE's capability in configuring multiple TAGs for a UE. UE may be configured with a configuration that is compatible with UE capability. Multiple TAG capability is an optional feature in LTE release 11 and multiple TAG capability may be introduced per band combination. UE may transmit its multiple TAG capability to eNB via an RRC message and eNB may consider UE capability in configuring TAG configuration.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from E-UTRAN to the UE. If the received RRC Connection Reconfiguration message includes the sCellToReleaseList, UE performs SCell release. If the received RRC Connection Reconfiguration message includes the sCellToAddModList, UE performs SCell additions or modification.

The UE context within the source eNB may contain information regarding roaming/handover restrictions which may be provided either at connection establishment or at the last TA (tracking area) update process. The source eNB may configure the UE measurement procedures employing at least one RRC connection reconfiguration message. The UE may be triggered to send at least one measurement report by the rules set by, for example, system information, RRC configuration, and/or the like. The source eNB may make a handover decision based on many parameters, for example, the measurement reports, RRM information, traffic and load, a combination of the above, and/or the like. The source eNB may initiate the handover procedure by sending a handover request message to one or more potential target eNBs. When the source eNB sends the handover request message, it may start a handover preparation timer. Upon reception of the handover request acknowledgement message the source eNB may stop the handover preparation timer.

The source eNB may transmit a handover request message to one or more potential target eNB passing information to prepare the handover at the target side. The handover request message may comprise time alignment capability information of the UE. The target eNB may employ the time alignment capability of the UE in order to properly configure TAG configuration of the UE before UE connects to the target UE. The target eNB may configure the UE considering the TAG configuration limitations and capabilities of the UE. For example, if the UE does not support multiple TAG capability, the target eNB may not configure the UE with multiple TAGs. In another example, if the UE does not support multiple TAG configuration with a certain band combinations, the eNB may consider this limitation in TAG configurations. In another example, a UE may not support inter-band TAG configuration, and eNB may consider this in configuring the UE before the UE accesses the target eNB. In another example embodiment, handover request message may further comprise the current multiple TAG configuration of the UE connected to the serving eNB.

During the handover preparation phase, the serving eNB may transmit UE's multiple TAG capability and/or UE's current multiple TAG configuration (TAG configuration of the UE in connection with the serving eNB) to one or more potential target eNBs. This information may be employed, at least in part, by the potential target eNB to configure the UE, for example, to configure multiple TAG configuration parameters.

Handover admission control may be performed by the target eNB dependent on many factors, for example, QoS required for the UE bearers, UE capabilities, UE configuration, target eNB load, a combination of the above, and/or the like. The target eNB may configure the required resources according to the received information from the serving eNB and may reserve a C-RNTI and/or a RACH preamble. The access stratum configuration to be used in the target cell may be specified independently (for example as an establishment) or as a delta compared to the access stratum-configuration used in the source cell (for example as a reconfiguration).

The target eNB may prepare handover with L1/L2 and may send the handover request acknowledge message to the source eNB. The handover request acknowledge message may include a transparent container to be sent to the UE as an RRC message to perform the handover. The container may include a new C-RNTI, target eNB security algorithm identifiers for the selected security algorithms, a dedicated RACH preamble, access parameters, SIBs, and/or other configuration parameters. The transparent container may further comprise the multiple TAG configurations for connection of the UE to the target eNB. The multiple TAG configurations may modify the TAG configuration of the UE or may keep the same TAG configuration that the UE has with the serving base station. The target eNB may generate the RRC message to perform the handover, for example, RRC connection reconfiguration message including the mobility control information. The RRC message may be sent by the source eNB towards the UE. The source eNB may perform the necessary integrity protection and ciphering of the message. The UE may receive the RRC connection reconfiguration message from the source eNB and may start performing the handover. The UE may not need to delay the handover execution for delivering the HARQ/ARQ responses to the source eNB.

After receiving the RRC connection reconfiguration message including the mobility control information, UE may perform synchronisation to the target eNB and accesses the target cell via RACH on the primary cell. UE Random access procedure may employ a contention-free procedure if a dedicated RACH preamble was indicated in the mobility control information. The UE random access procedure may employ a contention-based procedure if no dedicated preamble was indicated. UE may derive target eNB specific keys and may configure the selected security algorithms to be used in the target cell. The target eNB may respond with uplink allocation and timing advance. After the UE has successfully accessed the target cell, the UE may send an RRC connection reconfiguration complete message (C-RNTI) to confirm the handover and to indicate that the handover procedure is completed for the UE. UE may transmit a MAC uplink Buffer Status Report (BSR) Control Element (CE) along with the uplink RRC Connection Reconfiguration Complete message or may transmit a MAC uplink BSR CE whenever possible to the target eNB. The target eNB verifies the C-RNTI sent in the RRC Connection Reconfiguration Complete message. The target eNB may now begin sending data to the UE and receiving data from the UE.

FIG. 8 is an example flow diagram illustrating signalling messages during a handover as per an aspect of an embodiment of the present invention. According to some of the various aspects of embodiments, a serving base station may receive a first message from a wireless device on a primary cell in a plurality of cells at block 800. The first message may be an RRC UE capability message. The plurality of cells may comprise the primary cell and at least one secondary cell. The first message may comprise at least one parameter indicating whether the wireless device supports configuration of a plurality of time alignment groups (TAGs). The base station may receive a plurality of radio capability parameters from the wireless device.

In an example embodiment, the capability may be received on a first signalling bearer on the primary cell. The plurality of radio capability parameters may comprise a first sequence of one or more radio configuration parameters. A first radio configuration parameter in the first sequence may comprise a first parameter indicating whether multiple timing advance groups may be supported for a first band combination. The first band combination may be in a second sequence of one or more band combinations. The index of the first radio configuration parameter in the first sequence may determine the index of the first band combination in the second sequence.

According to some of the various embodiments, the size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

According to some of the various embodiments, the wireless device may support multiple inter-band timing advance groups if the list of band identifier(s) includes more than one band; and the first parameter indicates that multiple timing advance groups are supported. In yet other embodiments, the wireless device may support multiple intra-band timing advance groups if the list of band identifier(s) includes one band; and the first parameter indicates that multiple timing advance groups are supported.

According to some of the various embodiments, the wireless device may not support multiple timing advance configurations if none of the radio configuration parameters comprise a parameter indicating that multiple timing advance groups are supported.

An example is provided to further explain an embodiment. A wireless device may transmit an RRC message comprising UE capability information. The UE capability information may comprise an information element comprising a wireless device LTE radio capability parameters. The LTE radio capability parameters may comprise a plurality of parameters indicating various capability of the wireless device LTE radio. The plurality of radio capability parameters may comprise a second sequence of one or more band combinations. Each band combination IE parameter in the second sequence of one or more band combinations may comprise a list of one or more band identifier(s). An example band combination IE may be {(band-id1, band-parameters1), (band-id2, band-parameters2), (band-id3, band-parameters3). The example band combination IE comprises a sequence of band identifier(s): band-id1, band-id2, band-id3, and a sequence of band parameters. Band parameters may be uplink parameter(s) and/or downlink parameter(s). Each of the band identifier(s) may be one of a finite set of numbers, for example from a set of (1.64). Each of the numbers in the set may identify a specific band, for example number 14 may refer to 1950 MHz band-A, 23 may refer to 2100 MHz band-D, 24 may refer to 2100 MHz band-E. If band-id1=14, the band-id2=23, and band-id3=24, the wireless device supports band combination of these three bands. A second band combination in the second sequence may include band-id1=14 and band-id4=43. In the example, the second sequence of one or more band combinations are considered an array of one or more band combination IEs. In the example embodiment, two band combinations are in the second sequence of one or more band combinations.

In the example embodiment, a first sequence of one or more radio configuration parameters for example could be {(TAG-not-supported, other parameters1), (TAG-supported, other parameters2)}. The first radio configuration parameter is TAG-non-supported (with index 1), and the second radio configuration parameter is TAG-supported (with index 2). Index 1 in the first sequence comprise (TAG-non-supported) and corresponds to first index in the second sequence (the first band combination: band-id1=14, the band-id2=23, and band-id3=24). Index 2 in the first sequence comprise (TAG-supported) corresponds to index 2 in the second sequence (the second band combination band-id1 and band-id4). In the example, TAG configuration is not supported for band combination=(band-id1=14, the band-id4=43, and band-id3=24). TAG configuration is supported for band combination= (band-id1=14, the band-id2=43).

The serving base station may selectively transmit at least one second message to the wireless device if the at least one parameter indicates support for configuration of the plurality of TAGs at block 802. The at least one second message may configure a first plurality of TAGs in the wireless device. If the e at least one parameter does not indicate support for configuration of the plurality of TAGs, the base station may not configure a plurality of TAGs in the wireless device. If the at least one parameter indicates support for configuration of the plurality of TAGs, the base station may or may not configure the first plurality of TAGs in the wireless device depending on the required wireless device configuration and many other parameters. Transmission or not transmission (selective transmission) of at least one second message to configure the first plurality of TAGs is determined by the base station based on many criteria described in this specification.

The at least one second control message may be configured to cause in the wireless device: i) configuration of at least one secondary cell in the plurality of cells; and ii) assignment of each of the at least one secondary cell to a TAG in a first plurality of TAGs. The first plurality of TAGs may comprise a primary TAG and a secondary TAG. The primary TAG may comprise a first subset of the plurality of cells. The first subset may comprise the primary cell. Uplink transmissions by the wireless device in the primary TAG may employ a first synchronization signal transmitted on the primary cell as a primary timing reference. The secondary TAG may comprise a second subset of the at least one secondary cell. Uplink transmissions in the secondary TAG may employ a second synchronization signal on an activated secondary cell in the secondary TAG as a secondary timing reference.

The at least one second control message may be configured to further cause in the wireless device configuration of a time alignment timer for each of the first plurality of TAGs. The time alignment timer may start or restart in response to the wireless device receiving a timing advance command to adjust uplink transmission timing of a commanded TAG in the first plurality of TAGs. The at least one second control message may comprise a media access control dedicated information element comprising a sequence of at least one first information element. Each of the at least one first information element may comprise: a first TAG index of a first secondary TAG and a first time alignment timer value for the first secondary TAG. The at least one second control message may comprise at least one cell add-modify information element. Each of the at least one cell add-modify information element may comprise a first plurality of dedicated parameters. The first plurality of dedicated parameters may comprise a first cell index for a first secondary cell in the at least one secondary cell. The at least one second control message may further include configuration information for physical channels for the wireless device. The at least one second control message may be configured to further cause the wireless device to set up or modify at least one radio bearer.

The serving base station may receive at least one measurement report from the wireless device in response to the at least one second message. The at least one measurement report may comprise signal quality information of at least one of the at least one cell of at least one of the at least one target base station. The signal quality information may be derived at least in part employing measurements of at least one OFDM subcarrier. The serving base station may make a handover decision, based, at least in part, on the at least one measurement report, and/or other parameters, such as load, QoS, mobility, etc. The serving base station may also make a blind decision depending on base station internal proprietary algorithm.

The serving base station may transmit at least one third message to at least one of the at least one target base station at block 804. The at least one third message may comprise the at least one parameter indicating whether the wireless device supports configuration of a plurality of time alignment groups. The at least one third message may comprise a plurality of parameters of the configuration at least indicating association between at least one cell and a corresponding cell group index (configuration information of said first plurality TAGs). The at least one third message may be a handover request message transmitted to at least one target base station to prepare the target base stations for the handover of the wireless device. The UE capability parameters may be included in the at least one third message. Furthermore, UE dedicated radio parameters comprising UE multiple TAG configuration may also be included in the handover request message. UE dedicated radio parameters may comprise MACMainconfig information element. UE dedicated radio parameters may comprise TAG configuration including TAG indices and associated cell indices, and time alignment timer value for each cell group.

Figure 9:
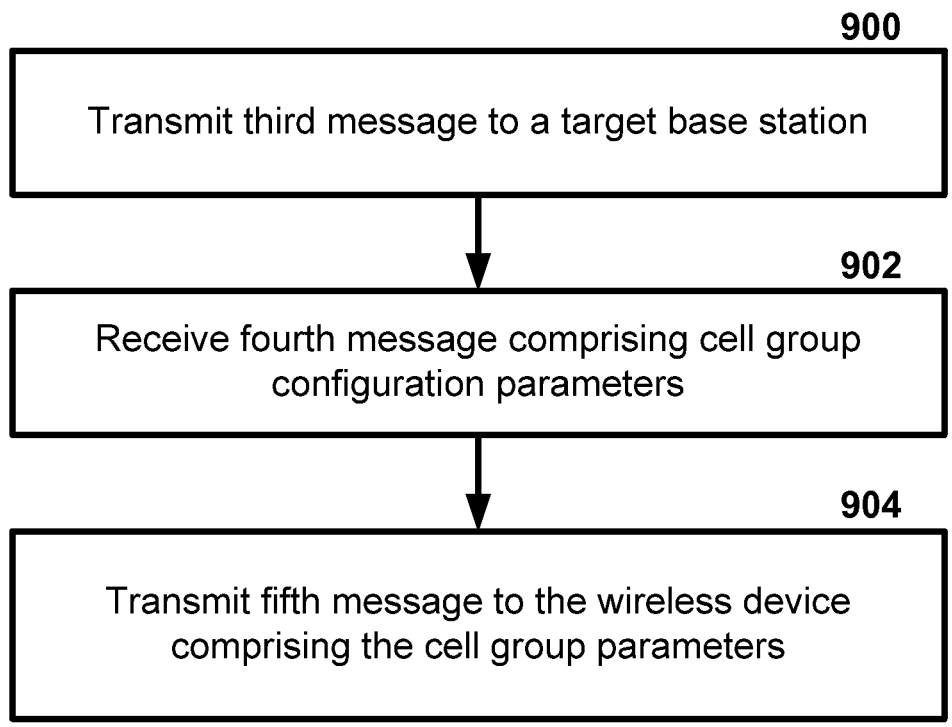
FIG. 9 is an example flow diagram illustrating signaling messages during a handover as per an aspect of an embodiment of the present invention.

FIG. 9 is an example flow diagram illustrating signalling messages during a handover as per an aspect of an embodiment of the present invention. According to some of the various aspects of embodiments, a serving base station, in response to making a handover decision by the serving base station for a wireless device, may transmit at least one third message to at least one target base station at block 900. The third message(s) in block 900 of FIG. 9 is the same as the third message(s) in block 804 of FIG. 8. The at least one third message may comprise the at least one parameter indicating whether the wireless device supports configuration of a plurality of time alignment groups. The format of the parameter (information element) indicating whether the wireless device supports configuration of a plurality of time alignment groups is the same format as the UE capability message transmitted by the wireless device to the base station in the first message as described in the specification. The at least one third message may further comprise a plurality of parameters of the configuration at least indicating association between at least one cell and a corresponding cell group index (configuration information of said first plurality TAGs). The parameters included in the configuration information of said first plurality TAGs may be the same as the ones included in the at least one second message as described in this specification. The at least one third message may be a handover request message transmitted to at least one target base station to prepare the target base stations for the handover of the wireless device. The UE capability parameters may be included in the at least one third message. Furthermore, UE dedicated radio parameters comprising UE multiple TAG configuration may also be included in the handover request message. UE dedicated radio parameters may comprise MACMainconfig information element. UE dedicated radio parameters may comprise TAG configuration including TAG indices and associated cell indices, and time alignment timer value for each cell group.

The serving base station may receive from one of the at least one target base station at least one fourth message at block 902. The at least one fourth message may comprise configuration of a plurality of cells for the wireless device. The plurality of cells may comprise a primary cell and at least one secondary cell. The configuration may associate a cell in the plurality of cells with a cell group index. The cell group index may identify one of a plurality of cell groups. The plurality of cell groups may comprise a primary cell group and a secondary cell group. A primary cell group may comprise a first subset of the plurality of cells. The first subset may comprise the primary cell. A secondary cell group may comprise a second subset of the at least one secondary cell.

The serving base station may transmit a fifth message to the wireless device at block 904. The fifth message may comprise a plurality of parameters of the configuration at least indicating association between at least one cell and a corresponding cell group index (configuration information of a plurality TAGs). The fifth message may cause the wireless device to start a synchronization process with the target base station (with a cell in the target base station).

The fifth message may be configured to further cause in the wireless device configuration of a time alignment timer for each of the plurality of cell groups. The fifth message may comprise a media access control dedicated information element comprising a sequence of at least one first information element. Each of the at least one first information element may comprise: a first cell group index of a first secondary cell group and a first time alignment timer value for the first secondary cell group. The base station may, before transmission of said fifth message, encrypt the fifth message and protect the fifth message by an integrity header. The fifth message may further include configuration information for physical channels for the wireless device. The fifth message may be configured to cause the wireless device to set up or modify at least one radio bearer. The fifth message may be configured to further cause the wireless device to configure at least one of a physical layer parameter, a MAC layer parameter, and an RLC layer parameter. The plurality of cells of the target base station may be in more than one frequency band, for example, one or more cells may be in frequency band A and one or more other cells may be in frequency band B (inter-band carrier aggregation). The wireless device may support configuration of a first plurality of cell groups.

According to some of the various aspects of embodiments, a serving eNB may modify TAG configuration of an SCell by removing (releasing) the SCell and adding a new SCell (with same physical cell ID and frequency) with an updated TAG index. An SCell may be released, for example, employing sCellToReleaseList IE in RRC Connection Reconfiguration message and be added employing sCelltoaddmodList IE with a different TAG index. During a handover process, there may be no need for explicitly release the cells (for example, employing sCellToReleaseList IE) for reconfiguration of TAG configuration. The RRC Connection Reconfiguration message with MobilityControlInfo IE (mobility control information) may comprise an updated TAG configuration, in which cells are assigned to timing advance groups. The updated TAG configuration may, for example, be configured for connection of the UE with a target base station or the same base station.

Figure 10:
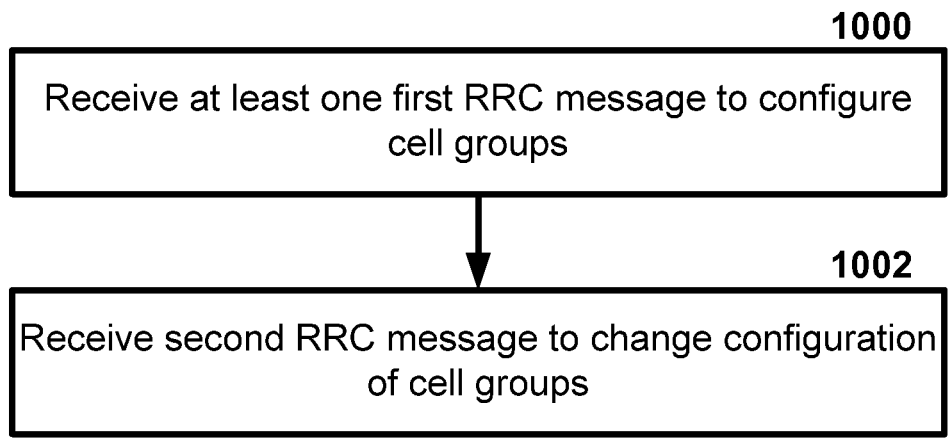
FIG. 10 is an example flow diagram in a wireless device illustrating changing configuration of cell groups as per an aspect of an embodiment of the present invention.

FIG. 10 is an example flow diagram in a wireless device illustrating changing configuration of cell groups as per an aspect of an embodiment of the present invention. According to some of the various aspects of embodiments, a wireless device may receive, at least one first control message from a base station at block 1000. The at least one first control message may be configured to cause configuration of a plurality of cells in the wireless device. The plurality of cells may comprise a primary cell and at least one secondary cell. A secondary cell in the plurality of cells may be identified by a cell index. The configuration may assign a secondary cell in the plurality of cells to a cell group using the cell group index. The cell group index may identify one of a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell.

TAG configuration of a wireless device may be reconfigured employing RRC connection reconfiguration message at block 1002. The wireless device may receive an RRC Connection Reconfiguration message. The Connection Reconfiguration message may or may not include mobility control information (in MobilityControlInfo Information Element). If mobility control information is included, the wireless device may start a handover process by performing a handover to a target base station as specified in the Connection Reconfiguration message. The wireless may also start a handover process with a different sector, or may remain connected to the same sector of the base station as specified in the Connection Reconfiguration message.

Processes for a TAG configuration change employing RRC Connection Reconfiguration message may be different depending on whether mobility control information is included in the RRC Connection Reconfiguration message. If the RRC Connection Reconfiguration message includes mobility control information (in MobilityControlInfo Information Element), the RRC Connection Reconfiguration message may re-assign a cell to an updated cell group without explicitly releasing the cell using SCellReleaseList IE. The updated cell group is configurable (capable) of being different from a currently configured cell group in the serving base station. An RRC Connection Reconfiguration message with mobility control information may reconfigure the TAG index associated with a cell to a different TAG index without explicitly releasing the secondary cell using sCellToReleaseList IE.

If the RRC Connection Reconfiguration message does not include mobility control information, the RRC Connection Reconfiguration message may be unconfigurable (incapable) of updating mapping between a given secondary cell and a cell group to a different cell group while the given secondary cell is configured. In this case, The RRC Connection Reconfiguration message may be configurable (capable) of updating mapping between the given secondary cell and a cell group to a different cell group, if the given secondary cell is released and added with a different configured cell group index. The secondary cell may be released employing sCellToReleaseList IE and may be added employing sCellToAddModList IE with a different cell group index.

In an example embodiment, TAG ID of a cell may not be simply changed using sCellToAddModList (without using mobility control information element) when the cell is configured. Each TAG may have its own timing reference, when a cell is moved from one TAG to another TAG. It may require changing its timing from one TAG to another TAG quickly and therefore this may result in timing irregularity in signals. A quick change in cell timing may be undesirable or difficult to implement. This issue which may result in a timing jump in cell timing may create undesirable interference and may increase bit error rate in the cell. There is a need to provide solutions for TAG configuration change in different scenarios. Such a solution may reduce unwanted interference and bit error rate during TAG change.

According to some of the various aspects of embodiments, a wireless device may receive at least one first control message from a base station at block 1000. The at least one first control message may be configured to cause configuration of a plurality of cells in the wireless device. The plurality of cells may comprise a primary cell and at least one secondary cell. Each of the at least one secondary cell may be identified by a cell index. The configuration may assign a secondary cell to a cell group identified by a cell group index. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. For example, in a TAG configuration, Cell 1 (PHY Cell ID=1) and Cell 2 (PHY Cell ID=2) may be assigned to sTAG index 1, and Cell 3 (PHY Cell ID=3) and Cell 4 (PHY Cell ID=4) may be assigned to sTAG index 2. Cell 5 (PHY Cell ID=5) may be assigned to the primary TAG (TAG index=0). TAG configuration may be configured in the wireless device employing information in the received RRC connection reconfiguration messages. The base station may require changing TAG configuration due to various reasons as described in the specifications. Examples comprise UE mobility, changes in channel conditions, traffic and load, and/or the like.

The wireless device may receive an RRC Connection Reconfiguration message. The RRC connection reconfiguration message may be employed to change TAG configuration in the wireless device at block 1002. If the RRC Connection Reconfiguration message comprises mobility control information, the RRC Connection Reconfiguration message may update cell group configuration. This reconfiguration may be performed selectively by the base station. The base station may change the TAG configuration or may not change the TAG configuration based on a set of predefined criteria. If the RRC connection reconfiguration message comprises Mobility Control information element, then the RRC connection reconfiguration message is capable of changing TAG configuration without explicitly releasing the cells. An RRC connection reconfiguration message with mobility control information may configure cells, for example, it may configure a new primary cell and a new set of secondary cells. It may also reconfigure TAG configuration depending on channel, traffic and other parameters in the network. After RRC connection reconfiguration message with mobility control information is received, the wireless device may consider the new configuration and may start a random access process with the primary cell (as identified in RRC connection reconfiguration message with mobility control information). There is no need to explicitly release cells, using sCelltoreleaselist, before a TAG associated with a cell is modified. In the example TAG configuration provided above, after cell group reconfiguration is applied, SCell 1, 2, and 3 may be assigned to sTAG index 1, and SCell4 may be assigned to sTAG index 2. This is an example reconfiguration possibility. sTAG index of an SCell index 3 is modified without the SCell3 being explicitly released employing sCelltoreleaselist. In another example reconfiguration with RRC message including MobilityControlInfo IE, the cell with (PHY Cell ID=1) may be configured as primary cell as a part of pTAG. And Cell 1 (PHY Cell ID=1), Cell 2 (PHY Cell ID=2), Cell 3 (PHY Cell ID=3), and Cell 4 (PHY Cell ID=4) may be assigned to sTAG index 1. In this example, a new cell is assigned as the pCell after RRC message is processed.

According to some of the various aspects of embodiments, if the RRC Connection Reconfiguration message does not comprise mobility control information, a different process may be employed for changing the associations of an SCell index to an sTAG index. The RRC Connection Reconfiguration message without Mobility control information element may be incapable of updating mapping between a first cell and a cell group to a different cell group while a first cell is configured. The RRC Connection Reconfiguration message may be capable of updating mapping between the first cell and the first cell group to a different cell group, if the first cell is released and then added again. For example, in a TAG configuration, sTAG index 1 may be associated with SCell1 and 2, and sTAG index 2 may be associated with SCell3 and 4. pTAG with index 0 may comprise the primary cell. In order to achieve an updated configuration in which sTAG index 1 may be associated with SCell 1, 2, and 3, and sTAG index 2 may be associated with SCell4. SCell index 3 may be released employing sCelltoreleaselist and may then be added again (with the same or different cell index) using sCellToAddModList with a new TAG ID. SCell release and addition may be performed in the same RRC connection reconfiguration message or in different RRC configuration messages.

According to some of the various aspects of embodiments, if the RRC Connection Reconfiguration message comprises mobility control information, the RRC Connection Reconfiguration message may initiate a handover from the base station to a target base station. If the RRC Connection Reconfiguration message comprises mobility control information, the RRC Connection Reconfiguration message may initiate a handover from a sector of the base station to a target sector of the base station (in an example the source sector and the target sector may be the same sector of the same base station). If the RRC Connection Reconfiguration message comprises mobility control information, the RRC Connection Reconfiguration message may change the primary cell with a first physical cell identifier to a different primary cell with a different physical cell identifier. In an example embodiment, if the RRC Connection Reconfiguration message comprises mobility control information, the second cell group index may be a cell group configured for communication between the wireless device and a target base station. If the RRC Connection Reconfiguration message comprises mobility control information, the RRC Connection Reconfiguration message may initiates a handover from the base station to a target base station, and the first cell index may be associated with a cell of the target base station after the handover is completed.

Figure 11:
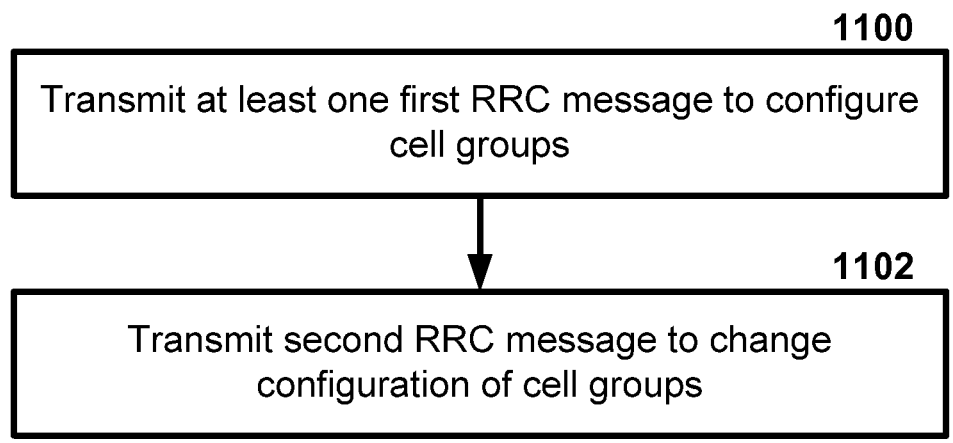
FIG. 11 is an example flow diagram in a base station illustrating changing configuration of cell groups as per an aspect of an embodiment of the present invention.

FIG. 11 is an example flow diagram in a base station illustrating changing configuration of cell groups as per an aspect of an embodiment of the present invention. According to some of the various aspects of embodiments, a base station may transmit at least one first control message to a wireless device at block 1102. The at least one first control message may be configured to cause configuration of a plurality of cells in the wireless device. The plurality of cells may comprise a first cell and at least one second cell, each cell in the plurality of cells may be identified by a physical cell identifier. The configuration may assign a cell in the plurality of cells to a cell group identified by a cell group index. The cell group index may identify one of a plurality of cell groups. The plurality of cell groups may comprise a primary cell group and a secondary cell group. A primary cell group may comprise a first subset of the plurality of cells. The first subset may comprise the first cell. The secondary cell group may comprise a second subset of the at least one second cell. Each cell in the plurality of cells may comprise a downlink carrier with a given downlink frequency. The physical cell identifier of each cell may be broadcasted employing a synchronization signal transmitted on the cell. The synchronization signal may comprise a primary synchronization signal and a secondary synchronization signal.

The base station may require changing TAG configuration due to various reasons as described in the specifications. Examples comprise UE mobility, changes in channel conditions, traffic and load, and/or the like. The base station may transmit an RRC Connection Reconfiguration message to a wireless device. The RRC connection reconfiguration message may be employed to change TAG configuration in the wireless device at block 1102. The base station may transmit at least one RRC Connection Reconfiguration message to modify some of the associations among the plurality of cells and the plurality of cell groups. In order to change a first cell group index associated with the first cell, the at least one RRC Connection Reconfiguration message: a) may add the first cell with an updated first cell group index different from the first cell group index; and b) may be transmitted with MobilityControlInfo Information Element. This method may work if the first cell is a primary cell or a secondary cell. In example embodiments, this method is advantageous from signalling perspective if the first cell is a primary cell. In other words, if the first cell is the primary cell, the at least one second RRC message may be configured to cause the wireless device to reconfigure the primary cell as a secondary cell with an updated first cell group index different from the first cell group index. And the at least one second RRC message may comprise mobility control information In order to change the first cell group index with at least one RRC Connection Reconfiguration message including MobilityControlInfo Information Element, the at least one RRC Connection Reconfiguration message adds the first cell, for example, with the updated first cell group index without explicitly releasing the first cell. In an example implementation, the first cell may be a primary cell of the base station before the RRC reconfiguration message is received. The first cell may be configured as a secondary cell after the RRC reconfiguration message is received and successfully processed by the wireless device. The at least one RRC Connection Reconfiguration message with MobilityControlInfo information element may change cell category of the first cell from a primary cell to a secondary cell for the wireless device and also change cell group assignments. In an example implementation, the at least one RRC Connection Reconfiguration message with MobilityControlInfo information element may change cell category of one of the cell(s) in the at least one secondary cell from a secondary cell to a new primary cell for the wireless device. The wireless device may start random access process with the base station on the new primary cell. Configured cells in the wireless device, except the new primary cell, may be deactivated in the wireless device after the RRC Reconfiguration message is received. The base station may send MAC activation command(s) to activate secondary cells. The base station may transmit PDCCH order to start random access process on a secondary cell of a secondary TAG after it activated the secondary cell.

According to some of the various aspects of embodiments, in order to change a second cell group index associated with one of the at least one secondary cell, the at least one RRC Connection Reconfiguration message: may release the one of the at least one second cell; may add the one of the at least one second cell with an updated second cell group index different from the second cell group index; and/or may be transmitted without MobilityControlInfo information element. The cell release may be performed employing SCelltoreleaselist information element in an RRC connection reconfiguration message. The cell addition may be performed employing SCelltoaddmodlist information element in an RRC connection reconfiguration message. In an example embodiment, SCelltoreleaselist and SCelltoaddmodlist information element may be comprised in the same RRC connection configuration message. In another example, SCelltoreleaselist and SCelltoaddmodlist information element may be comprised in the different RRC connection configuration messages.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex, b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 ms; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signalled and ra-PreambleIndex is not zero, then the Random Access Preamble and the PRACH Mask Index may be those explicitly signalled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signalled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indeces are allowed; or PRACH mask index 1 may mean that PRACH resource index 0 may be used. PRACH mask index may have different meaning in TDD and FDD systems.

The random-access procedure may be performed by UE setting PREAMBLE_RECEIVED_TARGET_POWER to preambleInitialReceivedTargetPower+DELTA_PREAMBLE+(PREAMBLE_TRANSMISSION_COUNTER−1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+10*f_id. Where t_id may be the index of the first subframe of the specified PRACH (0≤t_id<10), and f_id is the index of the specified PRACH within that subframe, in ascending order of frequency domain (0≤f_id<6). The UE may stop monitoring for RAR(s) after successful reception of a RAR containing random access preamble identifiers that matches the transmitted random access preamble.

According to some of the various aspects of embodiments, if a downlink assignment for this TTI (transmission tme interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero ms. If the RAR contains a random access preamble identifier corresponding to the transmitted random access preamble, the UE may consider this RAR reception successful and apply the following actions for the serving cell where the random access preamble was transmitted; process the received riming advance command for the cell group in which the preamble was transmitted, indicate the preambleInitialReceivedTargetPower and the amount of power ramping applied to the latest preamble transmission to lower layers (i.e., (PREAMBLE_TRANS-MISSION_COUNTER−1)*powerRampingStep); process the received uplink grant value and indicate it to the lower layers; the uplink grant is applicable to uplink of the cell in which the preamble was transmitted. If ra-PreambleIndex was explicitly signalled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER=preambleTransMax+1 and random access preamble is transmitted on the PCell, then UE may indicate a random access problem to upper layers (RRC). This may result in radio link failure. If PREAMBLE_TRANSMISSION_COUNTER=preambleTransMax+1 and the random access preamble is transmitted on an SCell, then UE may consider the random access procedure unsuccessfully completed. UE may stay in RRC connected mode and keep the RRC connection active even though a random access procedure unsuccessfully completed on a secondary TAG. According to some of the various aspects of embodiments, at completion of the random access procedure, the UE may discard explicitly signalled ra-PreambleIndex and ra-PRACH-MaskIndex, if any; and flush the HARQ buffer used for transmission of the MAC PDU in the Msg3 buffer. In addition, the RN may resume the suspended RN subframe configuration, if any.

According to some of the various aspects of embodiments, a UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the riming advance command for the indicated TAG, and start or restart the timeAlignmentTimer associated with the indicated TAG. When a timing advance command is received in a RAR message for a serving cell belonging to a TAG and if the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignmentTimers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \leq N_{TA} \leq 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of 16Ts (Ts: sampling time unit). The start timing of the random access preamble may obtained employing a downlink synchronization time in the same TAG. In case of random access response, an 11-bit timing advance command, TA, for a TAG may indicate NTA values by index values of TA=0, 1, 2, . . . , 1282, where an amount of the time alignment for the TAG may be given by NTA=TA×16. In other cases, a 6-bit timing advance command, TA, for a TAG may indicate adjustment of the current NTA value, NTA, old, to the new NTA value, NTA, new, by index values of TA=0, 1, 2, . . . , 63, where NTA, new=NTA, old+(TA−31)×16. Here, adjustment of NTA value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change NTA accordingly.

Downlink frames and subframes of downlink carriers may be time aligned (by the base station) in carrier aggregation and multiple TAG configuration. Time alignment errors may be tolerated to some extend. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 μs.

The UE may have capability to follow the frame timing change of the connected base station. The uplink frame transmission may take place $(N_{TA}+N_{TA\ offset}) \times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various embodiments, physical downlink control channel(s) may carry transport format, scheduling assignments, uplink power control, and other control information. PDCCH may support multiple formats. Multiple PDCCH packets may be transmitted in a subframe. According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format.

The transmission of a random access preamble, if triggered by the MAC layer, may be restricted to certain time and frequency resources. The start of a random access preamble may be aligned with the start of the corresponding uplink subframe at a wireless device with N_TA=0.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI (channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    a) transmitting, by a base station to a wireless device, at least one first radio resource control (RRC) message to cause in said wireless device:
        i) configuration of a plurality of cells comprising a primary cell and at least one secondary cell; and
        ii) assignment of a cell group index to a cell in said plurality of cells, said cell group index identifying a cell group in a plurality of cell groups, said plurality of cell groups comprising:
            (1) a primary cell group comprising a first subset of said plurality of cells, said first subset comprising said primary cell; and
            (2) a secondary cell group comprising a second subset of said at least one secondary cell; and
    b) transmitting, by said base station to said wireless device, at least one second RRC message to modify a first cell group index of a first cell in said wireless device, wherein:
        i) if said first cell is said primary cell, said at least one second RRC message is configured to cause said wireless device to reconfigure said primary cell as a secondary cell with an updated first cell group index different from said first cell group index, said at least one second RRC message comprising mobility control information; and
        ii) if said first cell is a secondary cell, said at least one second RRC message configured to cause said wireless device to release said secondary cell and add said secondary cell with an updated first cell group index different from said first cell group index, said at least one second RRC message not comprising mobility control information.

2. The method of claim 1, wherein:
    a) uplink transmissions by said wireless device in said primary cell group employ a first synchronization signal transmitted on said primary cell as a primary timing reference; and
    b) uplink transmissions in said secondary cell group employ a second synchronization signal on an activated secondary cell in said secondary cell group as a secondary timing reference.

3. The method of claim 1, wherein each cell in said plurality of cells comprises a downlink carrier.

4. The method of claim 1, wherein a physical cell identifier of a cell is broadcast employing a synchronization signal transmitted on said cell.

5. The method of claim 4, wherein said synchronization signal comprises a primary synchronization signal and a secondary synchronization signal.

6. The method of claim 1, wherein said at least one second RRC message with mobility control information causes, in said wireless device, the cell category of said first cell to change from a primary cell to a secondary cell.

7. The method of claim 1, wherein said at least one second RRC message with mobility control information causes, in said wireless device, the cell category of a cell in said at least one secondary cell to change from a secondary cell to a new primary cell.

8. The method of claim 7, further comprising initiating a random access process with said base station in said wireless device if said at least one second RRC message comprising mobility control information.

9. A base station comprising:
a) one or more communication interfaces;
b) one or more processors; and
c) memory storing instructions that, when executed, cause said base station to:
   i) transmit to a wireless device at least one first radio resource control (RRC) message configured to cause in said wireless device:
      (1) configuration of a plurality of cells comprising a primary cell and at least one secondary cell; and
      (2) assignment of a cell group index to a cell in said plurality of cells, said cell group index identifying a cell group in a plurality of cell groups, said plurality of cell groups comprising a primary cell group and a secondary cell group; and
   ii) transmit to said wireless device at least one second RRC message to modify a first cell group index of a first cell in said wireless device, wherein:
      (1) if said first cell is said primary cell, said at least one second RRC message is configured to cause said wireless device to reconfigure said primary cell as a secondary cell with an updated first cell group index different from said first cell group index, said at least one second RRC message comprising mobility control information; and
      (2) if said first cell is a secondary cell, said at least one second RRC message configured to cause said wireless device to release said secondary cell and add said secondary cell with an updated first cell group index different from said first cell group index, said at least one second RRC message not comprising mobility control information.

10. The base station of claim 9, wherein:
a) said primary cell group comprising a first subset of said plurality of cells, said first subset comprising said primary cell, uplink transmissions by said wireless device in said primary cell group employing a first synchronization signal transmitted on said primary cell as a primary timing reference; and
b) said secondary cell group comprising a second subset of said at least one secondary cell, uplink transmissions in said secondary cell group employing a second synchronization signal on an activated secondary cell in said secondary cell group as a secondary timing reference.

11. The base station of claim 9, wherein a physical cell identifier of a cell is broadcast employing a synchronization signal transmitted on said cell.

12. The base station of claim 11, wherein said synchronization signal comprises a primary synchronization signal and a secondary synchronization signal.

13. The base station of claim 9, wherein said at least one second RRC message with mobility control information causes, in said wireless device, the cell category of said first cell to change from a primary cell to a secondary cell for said wireless device.

14. The base station of claim 9, wherein said at least one second RRC message with mobility control information causes, in said wireless device, the cell category of a cell in said at least one secondary cell to change from a secondary cell to a new primary cell.

15. A method comprising:
a) receiving, by a wireless device from a base station, at least one first radio resource control (RRC) message to cause in said wireless device:
   i) configuration of a plurality of cells comprising a primary cell and at least one secondary cell; and
   ii) assignment of a cell group index to a cell in said plurality of cells, said cell group index identifying a cell group in a plurality of cell groups, said plurality of cell groups comprising a primary cell group and a secondary cell group; and
b) receiving, by said wireless device from said base station, at least one second RRC message to modify a first cell group index of a first cell in said wireless device, wherein:
   i) if said first cell is said primary cell, said at least one second RRC message is configured to cause said wireless device to reconfigure said primary cell as a secondary cell with an updated first cell group index different from said first cell group index, said at least one second RRC message comprising mobility control information; and
   ii) if said first cell is a secondary cell, said at least one second RRC message configured to cause said wireless device to release said secondary cell and add said secondary cell with an updated first cell group index different from said first cell group index, said at least one second RRC message not comprising mobility control information.

16. The method of claim 15, wherein:
a) said primary cell group comprises a first subset of said plurality of cells, said first subset comprising said primary cell, uplink transmissions by said wireless device in said primary cell group employing a first synchronization signal transmitted on said primary cell as a primary timing reference; and
b) said secondary cell group comprises a second subset of said at least one secondary cell, uplink transmissions in said secondary cell group employing a second synchronization signal on an activated secondary cell in said secondary cell group as a secondary timing reference.

17. The method of claim 15, wherein said at least one first RRC message is configured to further cause in said wireless device configuration of a time alignment timer for each of said plurality of cell groups.

18. The method of claim 15, further comprising starting a random access process with said base station if said at least one second RRC message comprises mobility control information.

19. The method of claim 15, further comprising starting, by said wireless device, a synchronization process with said base station if said at least one second RRC message comprises mobility control information.

20. The method of claim 15, further comprising transmitting, by said wireless device to said base station, a random access preamble to said base station if said at least one second RRC message comprises mobility control information.

* * * * *